US009026359B2

(12) United States Patent
Belimpasakis (10) Patent No.: US 9,026,359 B2
(45) Date of Patent: May 5, 2015

(54) VISUALLY REPRESENTING A THREE-DIMENSIONAL ENVIRONMENT

(75) Inventor: Petros Belimpasakis, Tampere (FI)

(73) Assignee: Nokia Corporation, Espoo (FI)

( * ) Notice: Subject to any disclaimer, the term of this patent is extended or adjusted under 35 U.S.C. 154(b) by 486 days.

(21) Appl. No.: 12/917,033

(22) Filed: Nov. 1, 2010

(65) Prior Publication Data

US 2012/0109513 A1 May 3, 2012

(51) Int. Cl.
| G01C 21/00 | (2006.01) |
| G01C 21/36 | (2006.01) |
| G06T 15/20 | (2011.01) |
| G06F 3/0481 | (2013.01) |
| G06F 3/0488 | (2013.01) |

(52) U.S. Cl.
CPC ........ *G01C 21/3638* (2013.01); *G01C 21/3664* (2013.01); *G06T 15/20* (2013.01); *G06F 3/04815* (2013.01); *G06F 3/04883* (2013.01)

(58) Field of Classification Search
USPC ........ 701/454, 457, 458; 340/995.14, 995.15, 340/995.16; 345/173, 419, 427
See application file for complete search history.

(56) References Cited

U.S. PATENT DOCUMENTS

| 6,987,512 | B2 * | 1/2006 | Robertson et al. | 345/427 |
| 7,142,205 | B2 * | 11/2006 | Chithambaram et al. | 345/418 |
| 7,215,335 | B2 * | 5/2007 | Matsumoto et al. | 345/419 |
| 7,519,469 | B2 * | 4/2009 | de Silva et al. | 701/454 |
| 7,839,405 | B2 * | 11/2010 | Ishii et al. | 345/427 |
| 7,873,470 | B2 * | 1/2011 | Baba et al. | 701/457 |
| 7,920,966 | B2 * | 4/2011 | Emoto et al. | 701/436 |
| 8,108,137 | B2 * | 1/2012 | Kim | 701/409 |
| 8,234,059 | B2 * | 7/2012 | Sugiyama et al. | 701/418 |
| 8,275,543 | B2 * | 9/2012 | Sim | 701/411 |

(Continued)

FOREIGN PATENT DOCUMENTS

| EP | 1 927 385 A2 | 6/2008 |
| EP | 2 194 508 A1 | 6/2010 |

(Continued)

OTHER PUBLICATIONS

"Google Street View Gets Smart Navigation," PC World, Jun. 5, 2009, [Online] [retrieved Nov. 25, 2013] [retrieved from: https://web.archive.org/web/20090608140358/http://www.pcworld.com/article/166178/google.html?].*

(Continued)

*Primary Examiner* — Thomas G Black
*Assistant Examiner* — Peter D Nolan
(74) *Attorney, Agent, or Firm* — Alston & Bird LLP (57) ABSTRACT

A method comprising:
presenting a three-dimensional environment, comprising routes, to a user by using a selected one of a plurality of perspective views of the environment that corresponds to a current position on a current route;
detecting a gesture user input comprising a characteristic that changes in time, and changing the current position on the current route to a new position on a route in response to the gesture user input wherein a first characteristic of the gesture user input determines a direction along the current route of the new position relative to the current position and a second characteristic of the gesture user input determines the new position; and
presenting the three-dimensional environment, comprising routes, to the user by using a newly selected one of the plurality of perspective views of the environment that corresponds to the new position.

16 Claims, 6 Drawing Sheets

(56) References Cited

U.S. PATENT DOCUMENTS

| | | | |
|---|---|---|---|
| 8,294,766 B2* | 10/2012 | Tsai et al. | 348/148 |
| 8,302,033 B2* | 10/2012 | Matas et al. | 715/863 |
| 2004/0051709 A1 | 3/2004 | Ogawa et al. | |
| 2005/0225559 A1* | 10/2005 | Robertson et al. | 345/581 |
| 2005/0234638 A1* | 10/2005 | Ogaki et al. | 701/209 |
| 2006/0132482 A1* | 6/2006 | Oh | 345/419 |
| 2007/0106466 A1* | 5/2007 | Noguchi | 701/209 |
| 2007/0260395 A1* | 11/2007 | Matsuoka et al. | 701/209 |
| 2008/0184173 A1 | 7/2008 | Sutanto et al. | |
| 2009/0082960 A1* | 3/2009 | Ramaswamy et al. | 701/211 |
| 2009/0262145 A1* | 10/2009 | Akita et al. | 345/679 |
| 2010/0045666 A1 | 2/2010 | Kornmann et al. | |
| 2010/0079501 A1* | 4/2010 | Ikeda et al. | 345/661 |
| 2010/0115455 A1* | 5/2010 | Kim | 715/781 |
| 2010/0123737 A1 | 5/2010 | Williamson et al. | |
| 2010/0125405 A1* | 5/2010 | Chae et al. | 701/200 |
| 2010/0146389 A1 | 6/2010 | Yoo et al. | |
| 2010/0169774 A1* | 7/2010 | Oda et al. | 715/702 |
| 2010/0188397 A1* | 7/2010 | Tsai et al. | 345/419 |
| 2011/0018827 A1* | 1/2011 | Wang et al. | 345/173 |

FOREIGN PATENT DOCUMENTS

| | | |
|---|---|---|
| JP | 2001-74481 A | 3/2001 |
| JP | 2010-157252 A | 7/2010 |
| WO | WO 2007/051893 A1 | 5/2007 |

OTHER PUBLICATIONS

Decle, F. et al., *Tech-note: ScrutiCam: Camera Manipulation Technique for 3D Objects Inspection*, IEEE Symposium on 3D User Interfaces, (2009), pp. 19-22.

International Search Report and Written Opinion for International Application No. PCT/FI2011/050852, mailed Dec. 23, 2011.

Extended European Search Report from corresponding European Patent Application No. 11837620, dated Jul. 31, 2014.

* cited by examiner

VISUALLY REPRESENTING A THREE-DIMENSIONAL ENVIRONMENT

TECHNOLOGICAL FIELD

Embodiments of the present invention relate to systems, apparatus, methods, computer programs for visually representing a three-dimensional environment, comprising routes, by selecting perspective views of the three-dimensional environment for rendering to a user.

BACKGROUND

Current systems can visually represent a three-dimensional environment, comprising routes, by selecting perspective views of the three-dimensional environment for display to a user.

The selected perspective view of the environment that is displayed corresponds to a 'viewing' position on a route. Changing the viewing position changes the perspective view.

It may be difficult for a user to control the viewing position.

SUMMARY

According to various, but not necessarily all, embodiments of the invention there is provided a method comprising: presenting a three-dimensional environment, comprising routes, to a user by using a selected one of a plurality of perspective views of the environment that corresponds to a current position on a current route; detecting a gesture user input comprising a characteristic that changes in time, and changing the current position on the current route to a new position on a route in response to the gesture user input wherein a first characteristic of the gesture user input determines a direction along the current route of the new position relative to the current position and a second characteristic of the gesture user input determines the new position; and presenting the three-dimensional environment, comprising routes, to the user by using a newly selected one of the plurality of perspective views of the environment that corresponds to the new position.

According to various, but not necessarily all, embodiments of the invention there is provided an apparatus comprising: at least one processor; and at least one memory including computer program code the at least one memory and the computer program code configured to, with the at least one processor, cause the apparatus at least to perform: presenting a three-dimensional environment, comprising routes, to a user by using a selected one of a plurality of perspective views of the environment that corresponds to a current position on a current route; detecting a gesture user input comprising a characteristic that changes in time, and changing the current position on the current route to a new position in response to the gesture user input wherein a first characteristic of the gesture user input determines a direction along the current route of the new position relative to the current position and a second characteristic of the gesture user input determines the new position; and re-presenting the three-dimensional environment, comprising routes, to the user by using a newly selected one of the plurality of perspective views of the environment that corresponds to the new position.

According to various, but not necessarily all, embodiments of the invention there is provided a method comprising: presenting a three-dimensional environment, comprising routes, to a user by using a selected one of a plurality of perspective views of the environment that corresponds to a current position on a current route; detecting a gesture user input comprising a characteristic that changes in time, and navigating from the current position on the current route to a new position in response to the gesture user input wherein the new position is at a predetermined waypoint selected in dependence upon the gesture input; and re-presenting the three-dimensional environment, comprising routes, to the user by using a newly selected one of the plurality of perspective views of the environment that corresponds to the new position.

According to various, but not necessarily all, embodiments of the invention there is provided a computer program which when loaded into a processor enables: presenting a three-dimensional environment, comprising routes, to a user by using a selected one of a plurality of perspective views of the environment that corresponds to a current position on a current route; changing of the current position on the current route to a new position in response to a gesture user input wherein a first characteristic of the gesture user input determines a direction along the current route of the new position relative to the current position and a second characteristic of the gesture user input determines the new position; and re-presenting the three-dimensional environment, comprising routes, to the user by using a newly selected one of the plurality of perspective views of the environment that corresponds to the new position.

DESCRIPTION

For a better understanding of various examples of embodiments of the present invention reference will now be made by way of example only to the accompanying drawings in which.

DETAILED DESCRIPTION

Figure 1:
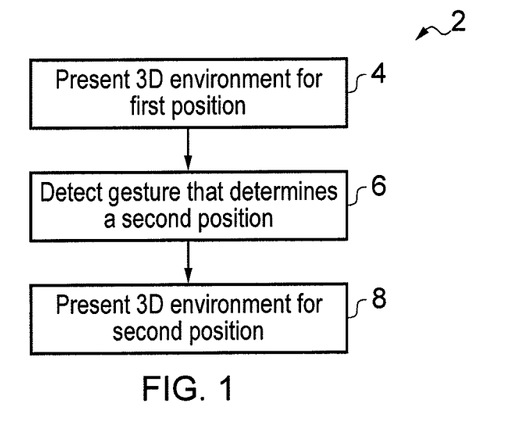
FIG. 1 illustrates a method of user navigation within a three-dimensional environment comprising routes.

FIG. 1 illustrates a method 2 of user navigation within a three-dimensional environment comprising routes. An example of a perspective view 32 of an environment, comprising routes 30, from a viewing position 34 is illustrated in FIG. 5A and an example of a plan view 40 of the environment is illustrated in FIG. 5B.

At block 4, the method 2 comprises presenting the three-dimensional environment to a user by using a selected one of a plurality of perspective views 32 of the environment that corresponds to a (current) viewing position 34 on a current route 30.

Figure 5A:
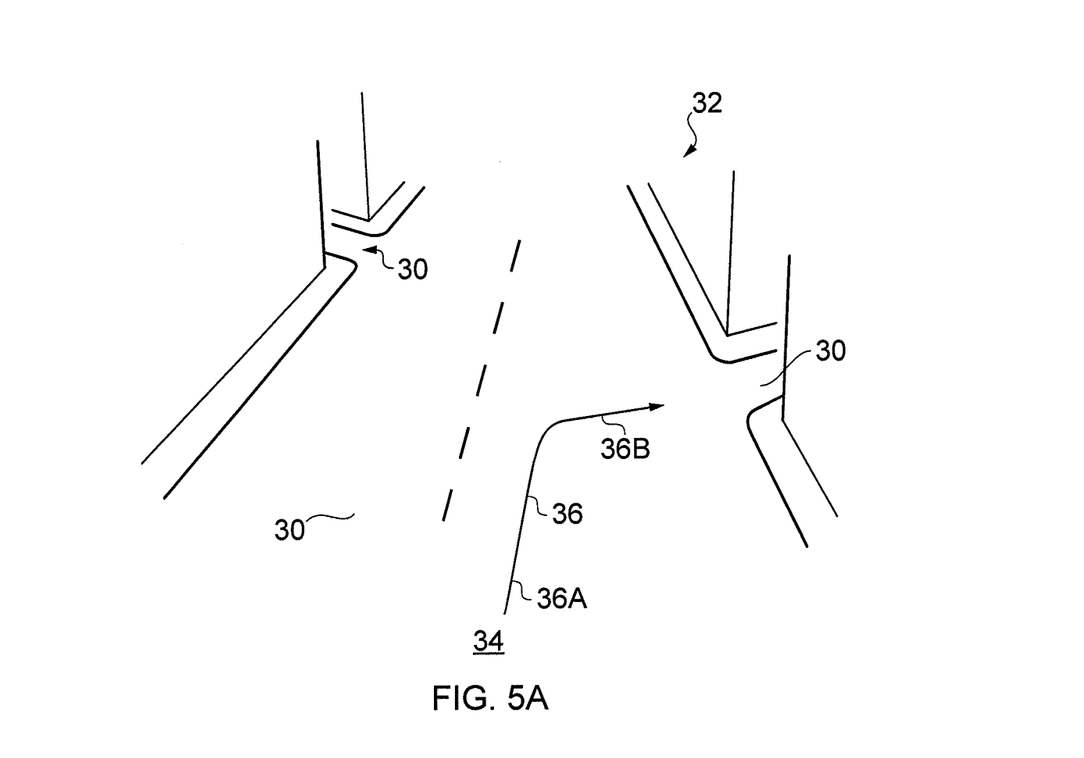
FIG. 5A schematically illustrates an example of a perspective view of an environment, comprising routes, from an initial viewing position.
Figure 5B:
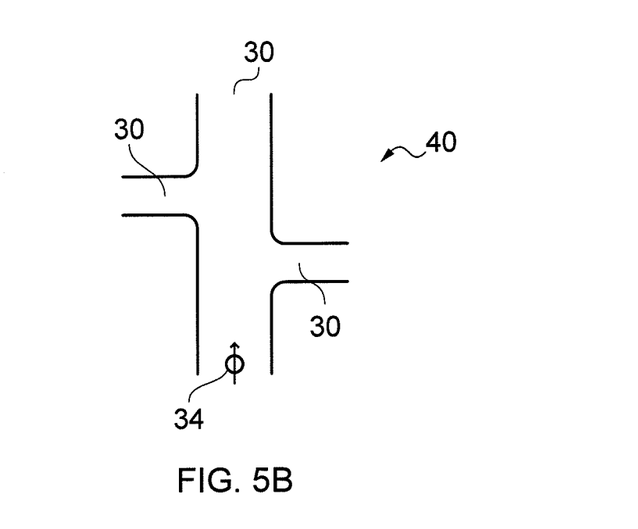
FIG. 5B gives an equivalent plan view of the environment depicted in FIG. 5A.

FIG. 5A schematically illustrates an example of a perspective view 32 of an environment, comprising routes 30, from a viewing position 34 and FIG. 5B gives an equivalent plan view 40 of the environment.

Next at block 6, the method 2 comprises detecting a gesture user input 36 and changing the current position 34 on the current route 30 to a new position 34' on a route in response to the gesture user input 36.

Then at block 8, the method 2 comprises presenting the three-dimensional environment to the user by using a newly selected one of the plurality of perspective views 32 of the environment that corresponds to the new position 34'.

Figure 6A:
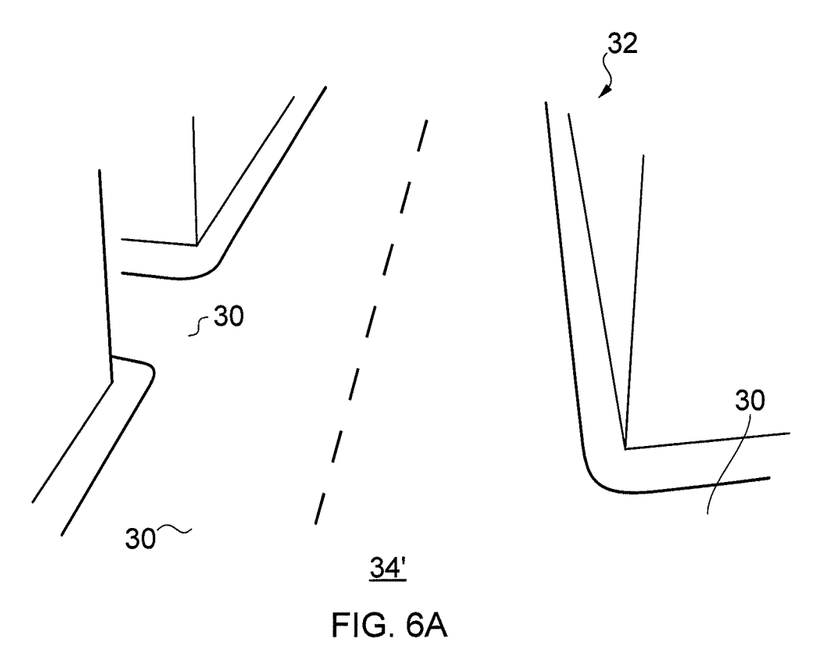
FIG. 6A schematically illustrates an example of a perspective view of an environment, comprising routes, from a subsequent viewing position to that illustrated in FIG. 5A.
Figure 6B:
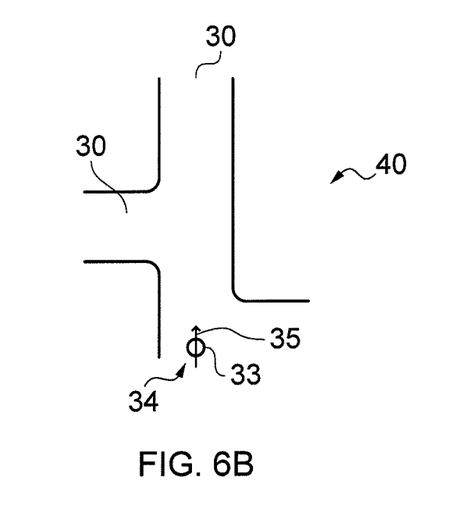
FIG. 6B gives an equivalent plan view of the environment depicted in FIG. 6A.

FIG. 6A schematically illustrates an example of a perspective view 32 of an environment, comprising routes 30, from the new viewing position 34' and FIG. 6B gives an equivalent plan view 40 of the environment. The new viewing position 34' is defined by a location 33 (indicated by the circle) and an orientation 35 (indicated by the arrow). In this example the orientation in FIGS. 5A and 6A is the same, along the current route 30.

Figures 7A, 7B:
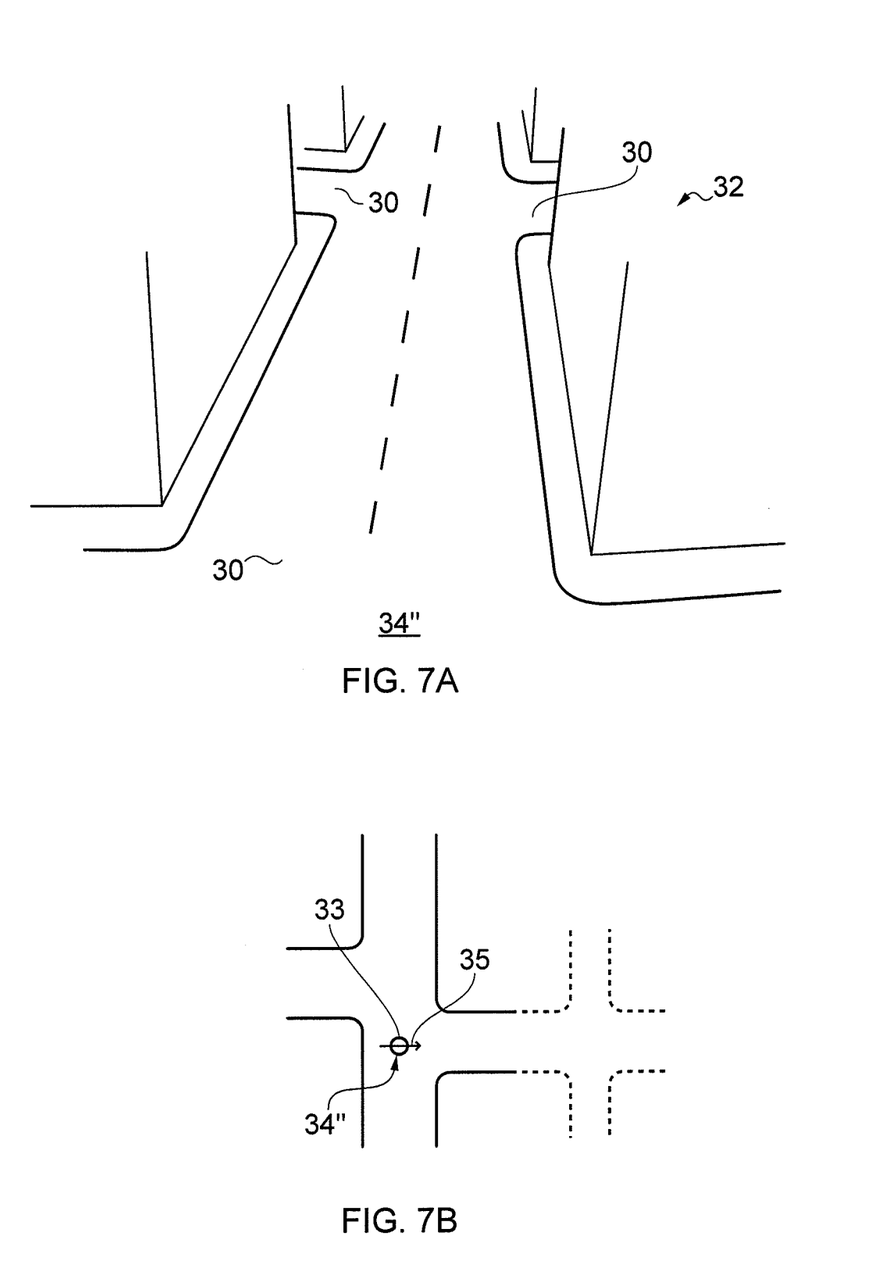
FIG. 7A schematically illustrates an example of a perspective view of an environment, comprising routes, from a subsequent viewing position to that illustrated in FIG. 5A.
FIG. 7B gives an equivalent plan view of the environment depicted in FIG. 7A.

FIG. 7A schematically illustrates another, different, example of a perspective view 32 of an environment, comprising routes 30, from a new viewing position 34" and FIG. 7B gives an equivalent plan view 40 of the environment. The new viewing position 34" is defined by a location 33 (indicated by the circle) and an orientation 35 (indicated by the arrow). In this example the orientation in FIGS. 5A and 7A is different. The orientation 35 of the new viewing position 34" is along a side route that intersects with the current route 30.

The gesture user input 36 comprises a characteristic that changes in time. An initial characteristic 36A of the gesture user input 36 may determine a navigation direction along the current route 30 (a direction of the new position relative to the current position) and a later characteristic 36B of the gesture user input 36 may determine the new position 34'.

The new position 34' may be at a predetermined waypoint selected in dependence upon the gesture user input 36.

The perspective view 32 may be a portion of a panoramic view. The perspective view 32 is determined by the viewing position 34 which includes the viewing location 33 and the viewing orientation 35. The panoramic view used is selected based upon the location 33. The portion of the panoramic view is selected based on the orientation 35.

The panoramic views 32 may be, for example, ground-view panoramas that are panoramic images captured between 1 and 4 m above ground level in the real world. The three-dimensional environment may therefore be a representation of the real world and user navigation within the three-dimensional environment may correspond to navigation within the real world whether on foot, by car or some other mode of transport.

The representation of the real-world may, for example, be an augmented not-real-time representation of real world, in which the captured images are augmented with additional content.

The method 2 of user navigation within a three-dimensional environment comprising routes 30 may be used within a satellite navigation system, whether in-vehicle or hand-held.

Figure 2:
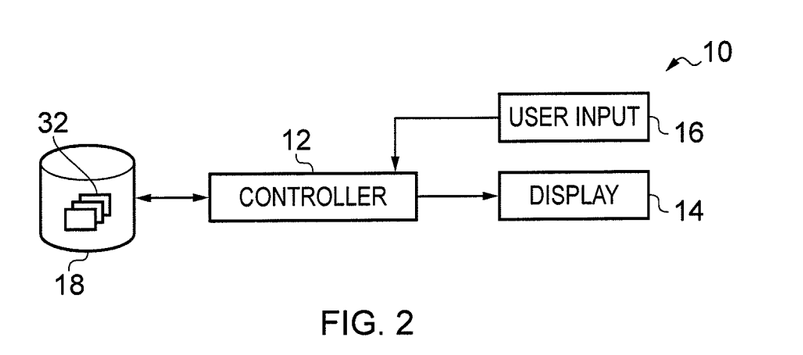
FIG. 2 schematically illustrates a system or apparatus for visually representing a three-dimensional environment, comprising routes, by selecting perspective views of the three-dimensional environment for rendering to a user.

FIG. 2 schematically illustrates a system or apparatus 10 for visually representing a three-dimensional environment, comprising routes 30, by selecting perspective views 32 of the three-dimensional environment for rendering to a user.

The perspective view 32 of the environment that is rendered corresponds to a viewing position 34 on a route 30. Changing the viewing position 34 changes the perspective view 32.

A route 30 may be a path, road, thoroughfare, cul-de-sac or any other defined transportation conduit.

A user is able to navigate through the environment by changing the viewing position 34.

For example, the user can navigate forwards along a route 30 by moving the viewing position 34 forward along the route 30 and the user can navigate backwards along a route 30 by moving the viewing position 34 backwards along the route 30. The user can navigate from one route 30 to another route 30 by moving the viewing position 34 from one route to another route.

The viewing position 34 can be controlled by user input.

A gesture user input 36 may be used by a user to change a current viewing position 34 on a current route 30 to a new viewing position 34' on the current route or on a new route.

The system or apparatus 10 comprises a controller 12, a rendering device 14, a user input 16 and a database 18.

The controller 12 is configured to at least read from the database 18, to receive input commands from the user input device 16 and to provide output commands to the rendering device 14.

The database 18 stores a plurality of perspective views 32. The user input 16 is configured to enable a user to make a gesture user input 36 via the user input 16.

The controller 12 is configured to present the three-dimensional environment to a user by accessing from the database 18 a selected one of a plurality of perspective views 32 of the environment, that corresponds to a current position 34 on a current route 30, for rendering on the rendering device 14.

The controller 12 is configured to detect a gesture user input 36 made via the user input 16 and is configured to change the current position 34 on the current route 30 to a new position 34' on a route in response to the gesture user input 36.

The controller 12 is configured to present the three-dimensional environment to the user by accessing from the database 18 a newly selected one of the plurality of perspective views 32 of the environment, that corresponds to the new position 34', for rendering via the rendering device 14.

The rendering device 14 may be any device suitable for providing a visual image to a user. It may, for example, be a display (as illustrated) or some other device that renders content visually such as a projection system or similar.

A gesture user input 36 is an input at a user input device 16 as a result of a gesture. A gesture is a time varying movement of an input point by a user. The input point may, for example, be a contact location between a user's digit and a touch sensitive screen and the gesture may be a tracing movement of the contact point over the screen as a result of movement of the digit. The input point may, as another example, be a pointer icon location on a display 14 and the gesture may be a movement of the pointer icon within the display as a consequence of user input at the user input device 16.

The time-varying movement of the gesture results in the gesture user input 36 comprising at least one time-varying characteristic. The time varying characteristic may, for example, be a kinematic parameter such as displacement, velocity or acceleration.

If the time-varying characteristic (e.g. direction of displacement) changes from a first characteristic (e.g. first direction of displacement 36A) to a second characteristic (e.g. second direction of displacement 36B), the first characteristic (e.g. first direction of displacement) may determine the navigation direction (the direction along the current route of the new viewing position 34' relative to the current viewing position 34) and the second characteristic (e.g. second direction of displacement 36B), may determine the new position 34'.

The new viewing position 34' may be a waypoint selected from a plurality of predetermined waypoints in dependence upon the gesture input 36. The selected waypoint may, for example, be positioned adjacent the current route 30 on a side of the current route 30 determined by the second direction of displacement 36B of the gesture user input 36.

Examples of waypoints include intersections of routes, points of interest, user designated waypoints etc.

In the example of FIGS. 6A, 6B, 7A, 7B the selected waypoint is an intersection between the current route 30 and an intersecting route that extends from the current route in the second direction of displacement 36B.

In these examples, the intersecting route is a next intersecting route 30 in the navigation direction 36A (the direction along the current route 30 of the new position 34' relative to the current position 34).

In other examples, the intersecting route is a next intersecting route 30 in the navigation direction 36A (the direction along the current route 30 of the new position 34' relative to the current position 34) that is navigable in the second direction 36B.

A navigation mode of the system or apparatus 10 may be used to determine whether a route is navigable in the second direction 36B. For example, some routes may be navigable in a pedestrian navigation mode that are not navigable in a car navigation mode and some routes may be navigable in a car navigation mode that are not navigable in a truck navigation mode.

In some examples, the selected waypoint is a next intersecting route in the navigation direction 36A (the initial direction of the gesture 36) that satisfies a constraint imposed by at least one constraining characteristic of the gesture user input.

Figure 8A:
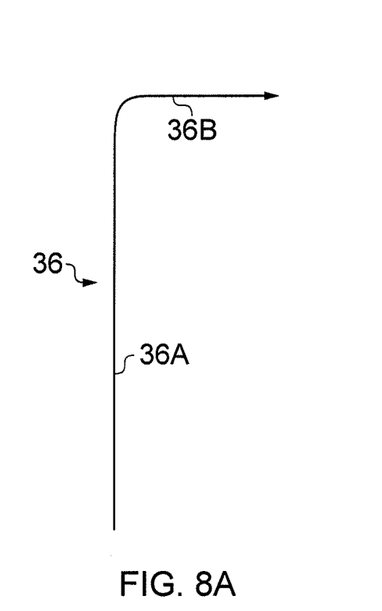
FIG. 8A illustrates an example of a gesture user input.
Figure 9A:
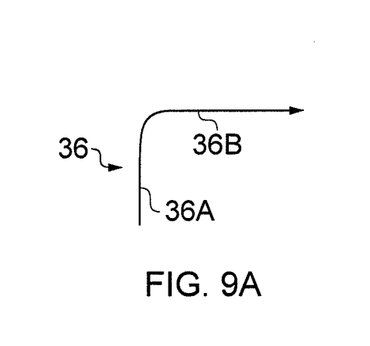
FIG. 9A illustrates an example of a gesture user input.

The constraining characteristic may be dependent upon a magnitude of a kinematic vector defined by the gesture user input. In FIGS. 8A and 9A, the gesture user input 36 comprises an initial upwards trace 36A followed by a sideways trace 36B at about right angles to the initial upwards trace 36A.

For example, referring to FIGS. 8A and 9A, the initial characteristic 36A (upwards trace) of the gesture user input 36 has different values in FIGS. 8A and 9A. The magnitude of the displacement 36A is larger in FIG. 8A than FIG. 9A. The constraint imposed by the longer displacement 36A in FIG. 8A, is that the selected waypoint 34' is an intersection with the next major route (see the plan view in FIG. 8B). The constraint imposed by the shorter displacement 36A in FIG. 9A, is that the selected waypoint 34' is an intersection with the next route whether major or minor (see the plan view in FIG. 9B).

Figure 8B:
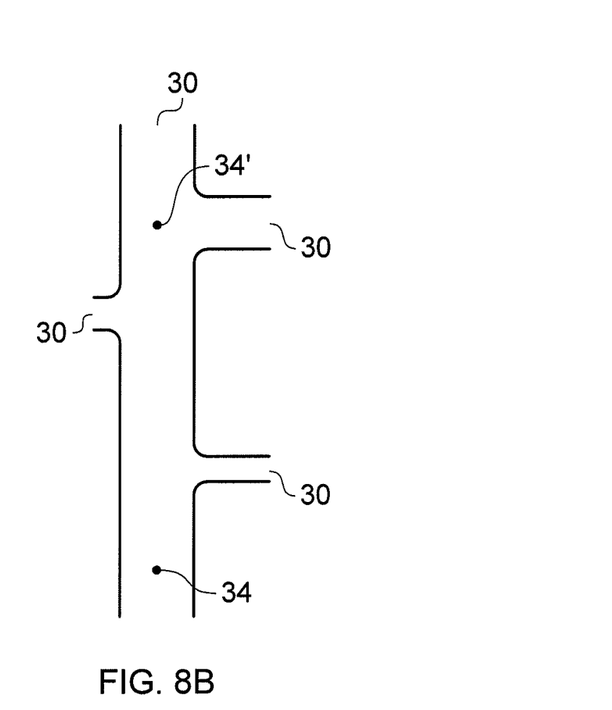
FIG. 8B illustrates the effect of the gesture user input illustrated in FIG. 8A.
Figure 9B:
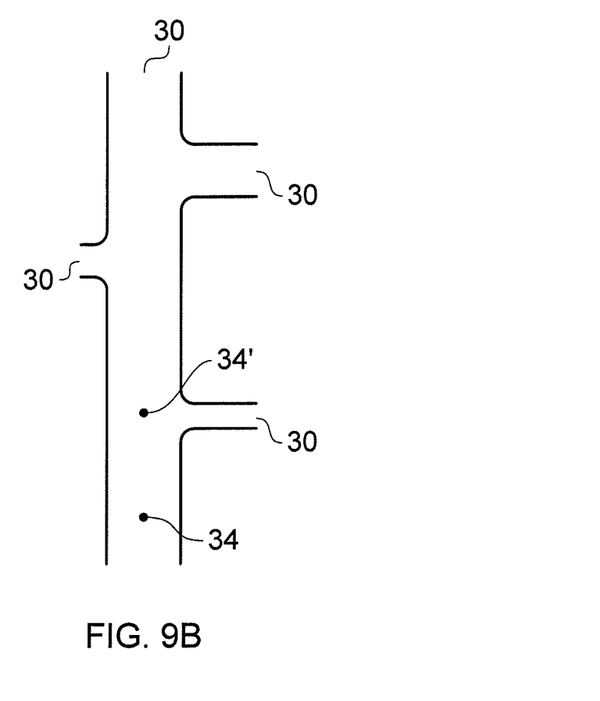
FIG. 9B illustrates the effect of the gesture user input illustrated in FIG. 8A.

Although the constraint in FIGS. 8A, 8B is the next major route and the constraint for FIGS. 9A, 9B is the next route, in other examples, different constraints may be used. For example, constraints may include one or more of: navigability, minimum predicted traffic flow, minimum actual traffic flow, whether the route is a thoroughfare, and minimum size or importance of the route.

Figure 10:
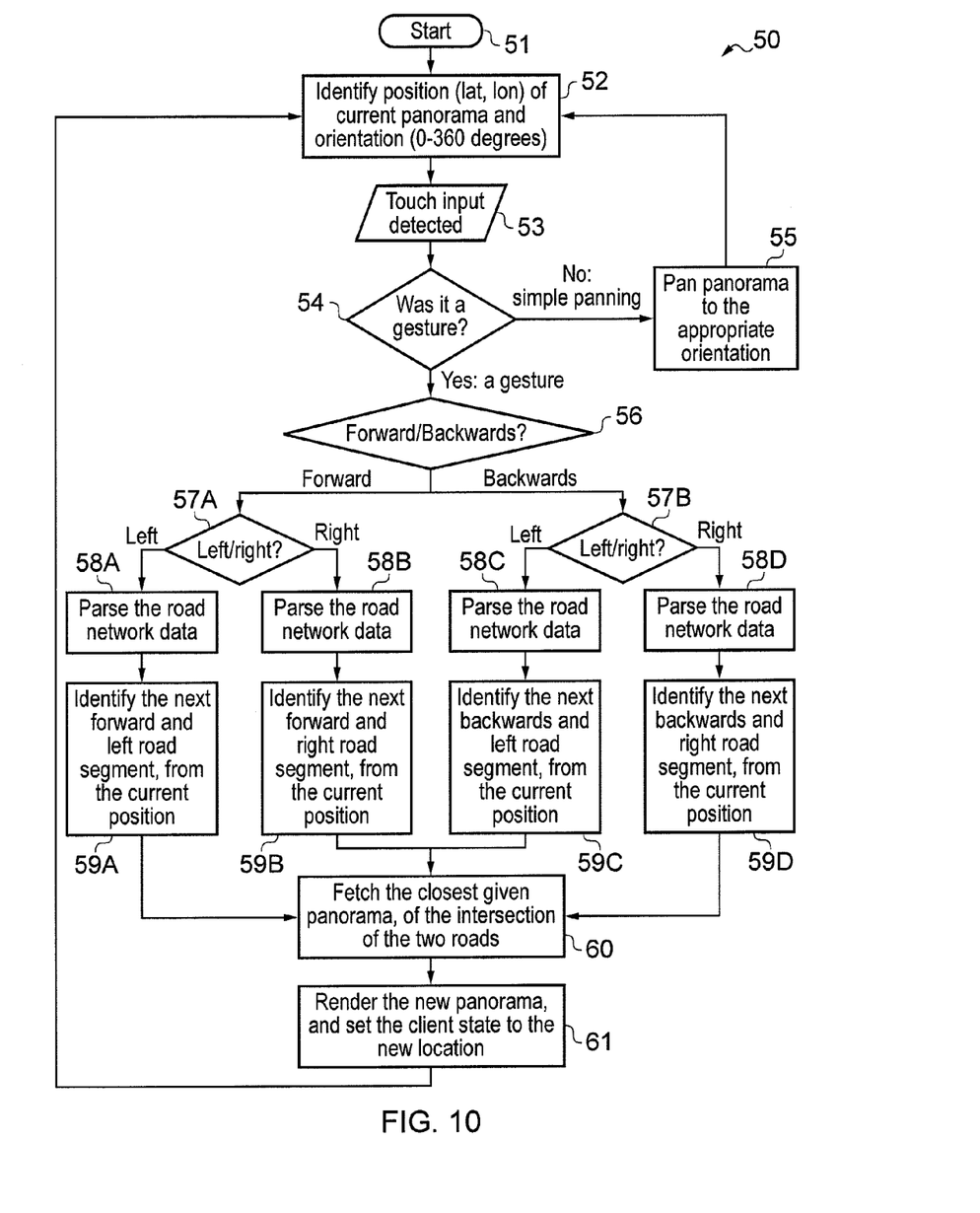
FIG. 10 illustrates a method for controlling user navigation within a three-dimensional environment comprising routes where the new viewing position is an intersection waypoint selected from four potential intersection waypoints (front left, front right, back left and back right)

FIG. 10 illustrates a method 50 for controlling user navigation within a three-dimensional environment comprising routes. In this example the new viewing position 34' may be an intersection waypoint selected from four potential intersection waypoints (front left, front right, back left and back right).

The method starts at block 51.

Then at block 52, the method identifies the position 34 of the current perspective view 32 using the location 33 (latitude, longitude) of the current panorama and the orientation 35 (0-360 degrees).

At block 53, a touch input is detected on a touch screen 16.

At block 54, it is determined if the detected touch input is a predefined gesture user input. If not, it is treated as a panning command at block 55, where the location 33 remains constant but the orientation 35 is changed to change the perspective view 32. The method then returns to block 52. If a gesture user input 36 is detected, the method moves to block 56.

At block 56, it is determined whether the gesture user input 36 is indicative of forwards or backwards movement. If forwards movement, the method moves to block 57A. If backwards movement, the method moves to block 57B.

At block 57A/57B, it is determined whether the gesture user input 36 is indicative of left or right movement. If left movement the method moves to block 58A from block 57A or block 58C from block 57B. If right movement the method moves to block 58B from block 57A or block 58D from block 57B.

At each of blocks 58A, 58B, 58C and 58D road network data, which is provided in a standard marked-up format, is parsed and then in respective blocks 59A, 59B, 59C, 59D the next intersection from the current position 34 is determined. The block 59A determines the next intersection that is forward and left of the current position 34. The block 59B determines the next intersection that is forward and right of the current position 34. The block 59C determines the next intersection that is backward and left of the current position 34. The block 59D determines the next intersection that is backward and right of the current position 34.

Next at block 60, the closest available panorama to the determined intersection is fetched.

Then at block 61, the current position is updated to the new position at the next intersection and the new panorama is rendered with the appropriate orientation. The method then returns to block 52.

Implementation of controller 12 can be in hardware alone (a circuit, a processor . . . ), have certain aspects in software including firmware alone or can be a combination of hardware and software (including firmware).

The controller 12 may be implemented using instructions that enable hardware functionality, for example, by using executable computer program instructions in a general-purpose or special-purpose processor that may be stored on a computer readable storage medium (disk, memory etc) to be executed by such a processor.

Figure 3:
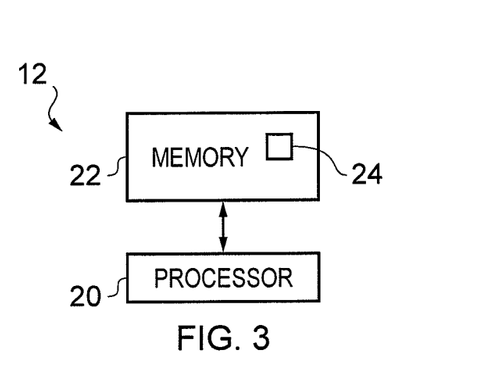
FIG. 3 schematically illustrates an example of the controller.

FIG. 3 schematically illustrates an example of the controller 12 comprising a processor 20 configured to read from and write to a memory 22. The processor 20 may also comprise an output interface via which data and/or commands are output by the processor 20 and an input interface via which data and/or commands are input to the processor 20.

The memory 22 stores a computer program 24 comprising computer program instructions that control the operation of the apparatus 10 when loaded into the processor 20. The computer program instructions 24 provide the logic and routines that enables the apparatus 10 to perform the methods illustrated in FIG. 1. The processor 20 by reading the memory 22 is able to load and execute the computer program 24.

An apparatus 10 may therefore comprise: at least one processor 20; and at least one memory 22 including computer program code 24 the at least one memory 22 and the computer program code 24 configured to, with the at least one processor 20, cause the apparatus at least to perform presenting a three-dimensional environment, comprising routes 20, to a user by using a selected one of a plurality of perspective views 32 of the environment that corresponds to a current position 34 on a current route 30;

detecting a gesture user input 36 comprising a characteristic that changes in time, and changing the current position 34 on the current route to a new position 34' in response to the gesture user input 36; and re-presenting the three-dimensional environment, comprising routes 30, to the user by using a newly selected one of the plurality of perspective views 32 of the environment that corresponds to the new position 34'.

The programmed processor 20 may also configured to select, in dependence upon the gesture user input, one of a plurality of predetermined waypoints as the new position.

The programmed processor 20 may also configured to detect a gesture user input comprising a characteristic that changes in time, comprises detecting a change in direction of a kinematic vector defined by user input.

Figure 4:
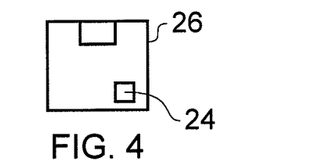
FIG. 4 schematically illustrates a suitable delivery mechanism for a computer program.

The computer program may arrive at the apparatus 10 via any suitable delivery mechanism 26 as schematically illustrated in FIG. 4. The delivery mechanism 26 may be, for example, a computer-readable storage medium, a computer program product, a memory device, a record medium such as a compact disc read-only memory (CD-ROM) or digital versatile disc (DVD), an article of manufacture that tangibly embodies the computer program 24. The delivery mechanism may be a signal configured to reliably transfer the computer program 24.

The apparatus 10 may propagate or transmit the computer program 24 as a computer data signal.

Although the memories 22, 18 are illustrated as single components they may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

As used here 'module' refers to a unit or apparatus that excludes certain parts/components that would be added by an end manufacturer or a user. The controller 12 may be a module.

The blocks illustrated in FIGS. 1 and/or 10 may represent steps in a method and/or sections of code in the computer program 24. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

A 'real-world' route may be provided by cartographers, city/state/country authorities, end users etc. A 'virtual' route may be defined in the system or apparatus 10 using an appropriate data structure. A three-dimensional environment, comprising routes, is presented to a user by using a selected one of a plurality of perspective views of the environment that corresponds to a current position on a current route. The selected perspective view may include virtual routes and if so these virtual routes are aligned with the real-world' routes The term 'intersection' used in this document is used to describe or define when one route meets another route such that a transportation conduit exists in at least one direction between the routes. The use of the term intersection does not imply that one route is a major route and the other is a minor route, although at some intersections this may be the case. In some examples, a route may pass through another route at an intersection or merge with another route at an intersection. For example, the join between routes may be, for example, any of the joins from the following non-exhaustive list: a junction such as a T-junction or Y-junction; a crossroads; a traffic circle (roundabout, rotary); and a feeder lane such as a ramp or spur that provides exit or entrance to another route (typically but not exclusively a highway).

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method comprising:
   causing display of a selected one of a plurality of perspective views of an environment that corresponds to a current position on a current route;
   receiving an indication of a gesture user input, wherein the gesture user input is continuous and comprises at least two characteristics, each characteristic having a different associated direction of movement of the gesture user input across a display, and wherein the gesture user input indicates a new position and an orientation of a user based on a detected movement of the user along the current route; and
   identifying a different perspective view of the plurality of perspective views based on the at least two characteristics and the respective associated directions of the gesture input, the new position and the orientation.

2. A method as claimed in claim 1, wherein the new position is proximate to one of a plurality of predetermined waypoints.

3. A method as claimed in claim 1, further comprising:
   selecting one of a plurality of predetermined waypoints based on the gesture user input, the identification of the different perspective view being dependent upon the selected waypoint.

4. A method as claimed in claim 1, wherein the new position corresponds to a waypoint positioned adjacent the current route on a side of the current route determined based on the gesture user input.

5. A method as claimed in claim 1, wherein the new position is an intersection of routes.

6. A method as claimed in claim 1, wherein the new position corresponds to an intersection between the current route and an intersecting route that extends from the current route.

7. A method as claimed in claim 1, wherein the new position corresponds to an intersection between the current route and an intersecting route, wherein the intersecting route is a next intersecting route in a direction of the movement along the current route.

8. A method as claimed in claim 1, wherein the new position corresponds to an intersection between the current route and an intersecting route, wherein the intersecting route is a next intersecting route that is navigable.

9. A method as claimed in claim 8, further comprising using a current mode of movement to determine whether a route is navigable.

10. A method as claimed in claim 1, wherein the new position corresponds to an intersection between the current route and an intersecting route, wherein the intersecting route is a next intersecting route that satisfies a constraint imposed by at least one constraining characteristic of the gesture user input.

11. The method of claim 1, wherein identifying the different perspective view of the plurality of perspective views is further based on a magnitude of displacement between the current position and the new position.

12. The method of claim 1, wherein the gesture user input is a continuous input comprising a transition between the at least two characteristics.

13. A method as claimed in claim 1, wherein the movement reflects a change in direction of the user.

14. An apparatus comprising:
   at least one processor; and
   at least one memory including computer program code,
   the at least one memory and the computer program code configured to, with the at least one processor, cause the apparatus at least to perform
      causing display of a selected one of a plurality of perspective views of an environment that corresponds to a current position on a current route;
      receiving an indication of a gesture user input, wherein the gesture user input is continuous and comprises at least two characteristics, each characteristic having a different associated direction of movement of the gesture user input across a display, and wherein the gesture user input indicates a new position and an orientation of a user based on a detected movement of the user along the current route; and
      identifying a different perspective view of the plurality of perspective views based on the at least two characteristics and the respective associated directions of the gesture input, the new position and the orientation.

15. An apparatus as claimed in claim 14, wherein the at least one memory and the computer program code are further configured to, with the at least one processor, cause the apparatus at least to select one of a plurality of predetermined waypoints based on the gesture input, the identification of the different perspective view being dependent upon the selected waypoint.

16. A computer program comprising at least one non-transitory computer-readable storage medium having computer-executable program code instructions stored therein, the computer-executable program code instructions comprising program code instructions to:
   cause display of a selected one of a plurality of perspective views of an environment that corresponds to a current position on a current route;
   receive an indication of a gesture user input, wherein the gesture user input is continuous and comprises at least two characteristics, each characteristic having a different associated direction of movement of the gesture user input across a display, and wherein the gesture user input indicates a new position and an orientation of a user based on a detected movement of the user along the current route; and
   identify a different perspective view of the plurality of perspective views based on the at least two characteristics and the respective associated directions of the gesture input, the new position and the orientation.

* * * * *